Dec. 1, 1959 R. C. STANFORD 2,915,711

SUPPRESSED CARRIER MODULATING SYSTEM

Filed Oct. 14, 1957

Inventor
Robert C. Stanford
Schroeder, Hofgren, Brady and Wegner
Attorneys

United States Patent Office 2,915,711

Patented Dec. 1, 1959

2,915,711

SUPPRESSED CARRIER MODULATING SYSTEM

Robert C. Stanford, Warrenville, Ill., assignor to The Hallicrafters Co., a corporation of Delaware Application October 14, 1957, Serial No. 689,903

3 Claims. (Cl. 332—52)

This invention relates to a modulating system and particularly to a modulating system designed for suppressed carrier transmission.

A principal object of the invention is the provision of a novel and improved modulating system particularly designed for suppressed carrier and single side band operation, and which is extremely stable. A major feature of the invention is the provision of a modulating system for suppressed carrier operation, which utilizes a passive carrier balance or suppression circuit.

Another feature is the provision of a system including a source of carrier signal, a balanced impedance connected with the carrier signal source, a source of modulating signal, and means connecting the modulating signal with the balanced impedance, to unbalance it in accordance with the modulating signal. A further feature is that the balanced impedance is a band suppression filter; and that the filter includes a resistive balancing element, the resistance of which is varied in accordance with the modulating signal.

Still a further feature is that the balanced impedance is a bridged T filter, tuned to the carrier frequency. Yet another feature is that the resistive balancing element is a diode connected in the shunt leg of the bridged T filter.

Further features and advantages of the invention will be readily apparent from the following specification and from the drawings, in which.

Previously known suppressed carrier modulating systems generally utilize a push-pull amplifier circuit in order to eliminate or suppress the carrier frequency in the output. If the amplifier elements used in such systems are not properly matched, and the circuit components are not carefully selected, a substantial portion of the carrier may not be eliminated; furthermore, over periods of time, the characteristics of one of the amplifier elements may change, unbalancing the circuit. The result of such unbalance is the appearance of substantial carrier energy in the output. The modulating system of the present invention utilizes passive elements, as contrasted with active elements, such as amplifiers, and is much more stable over long periods of time.

Figure 1:
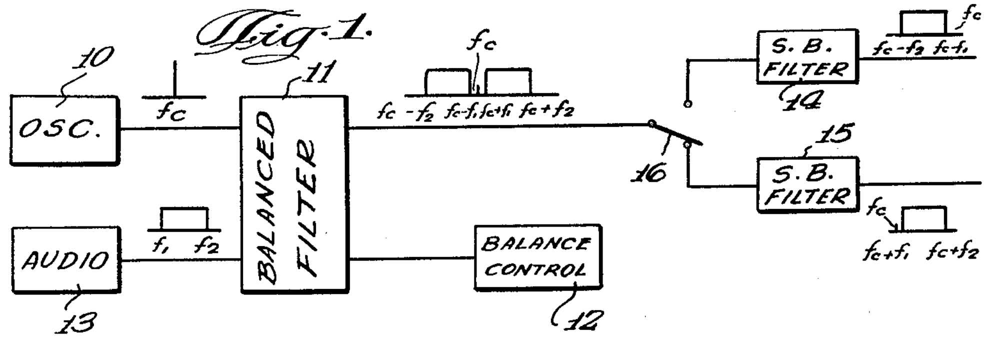
Figure 1 is a block diagram of a modulating system embodying the invention.

Turning now to Figure 1 of the drawings, the invention is illustrated in block form. An oscillator 10 provides a signal of suitable amplitude at the carrier frequency, $f_c$. The carrier signal is coupled to a balanced filter 11, the phase of which may be properly balanced by adjustment of variable element 12. The audio modulating signal, which may comprise a band of frequencies from $f_1$ to $f_2$, is supplied by an audio source 13. Briefly, the audio signal is impressed upon the balanced filter 11 in such a manner that it unbalances the filter in accordance with the variations of the audio signal. Because of the nonlinear characteristics of the filter 11, the carrier signal $f_c$, is modulated by the audio and the two side bands, comprising the sum and difference of the carrier and the audio signal appear in the output. The carrier frequency $f_c$, is itself highly attenuated by the action of the filter.

For single side band operation, a pair of side band filters 14 and 15 are provided, with a switch 16 for directing the output of the modulator filter through the desired filter channel.

Figure 2:
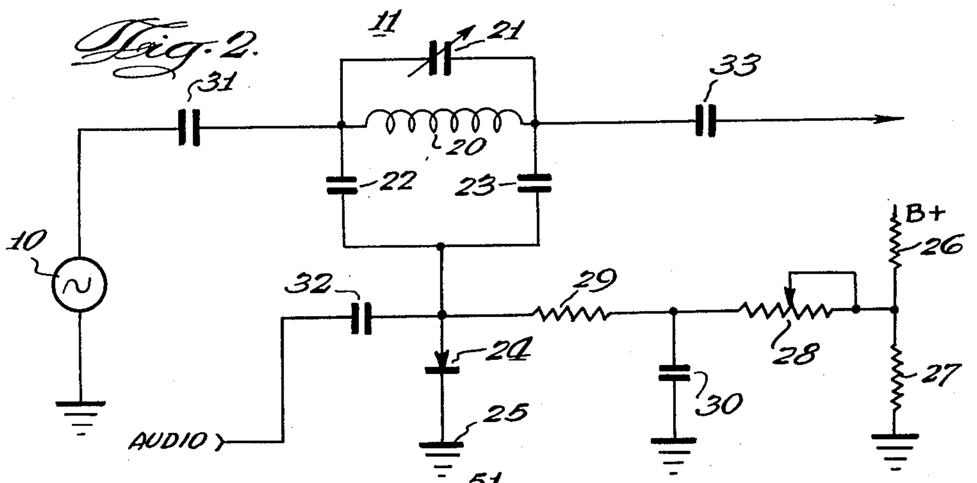
Figure 2 is a schematic circuit drawing of one embodiment of the invention.

In Figure 2, a circuit is illustrated for a suppressed carrier modulator designed to operate with a carrier frequency of 5 megacycles. In describing the circuit, values will be assigned to the various circuit components in order to disclose a complete operative system. It is to be understood that these values are not critical, unless specifically so stated, and that changes will be apparent to those skilled in the art. The balanced filter 11 comprises a bridged T filter including a series element comprising an inductor 20 and a variable capacitor 21, 8–55 $\mu\mu$f. (micromicrofarads) connected in parallel and tuned to resonance at the carrier frequency, $f_c$. The shunt leg of the bridged T filter includes a pair of capacitors 22 and 23, 1000 $\mu\mu$f. each, with a series diode element 24 returned to a common connection or ground 25. A D.C. bias is provided for the diode from a voltage divider made up of resistors 26, 150,000 ohms, and 27, 2700 ohms, connected to a 150 volt regulated B supply. An adjustable resistor 28, 1 megohm, is connected between the juncture of resistors 26 and 27 and through a decoupling resistor 29, 33,000 ohms, with the diode 24. The decoupling circuit is completed by a capacitor 30, 0.02 $\mu$f. connected to ground. Adjustment of resistor 28 varies the apparent resistance of the diode 24 and is set so that phase balance is achieved in the filter.

The carrier signal is coupled from the carrier signal source 10 through a capacitor 31, 47 $\mu\mu$f., to the filter; while the audio signal is coupled through capacitor 32, 0.01 $\mu$f., to the diode 24. The output of the filter is coupled through capacitor 33, 47 $\mu\mu$f., to further apparatus, as shown in Figure 1.

With the filter properly balanced (by adjustment of capacitor 21 and resistor 28) and with no audio signal, the carrier frequency $f_c$, is substantially completely attenuated in the filter. However, when an audio signal is applied to the diode 24, the filter is unbalanced (with respect to phase) at the audio rate, and in an amount dependent upon the amplitude of the modulating signal. This results in the appearance of the side bands in the output of the filter.

Figure 3:
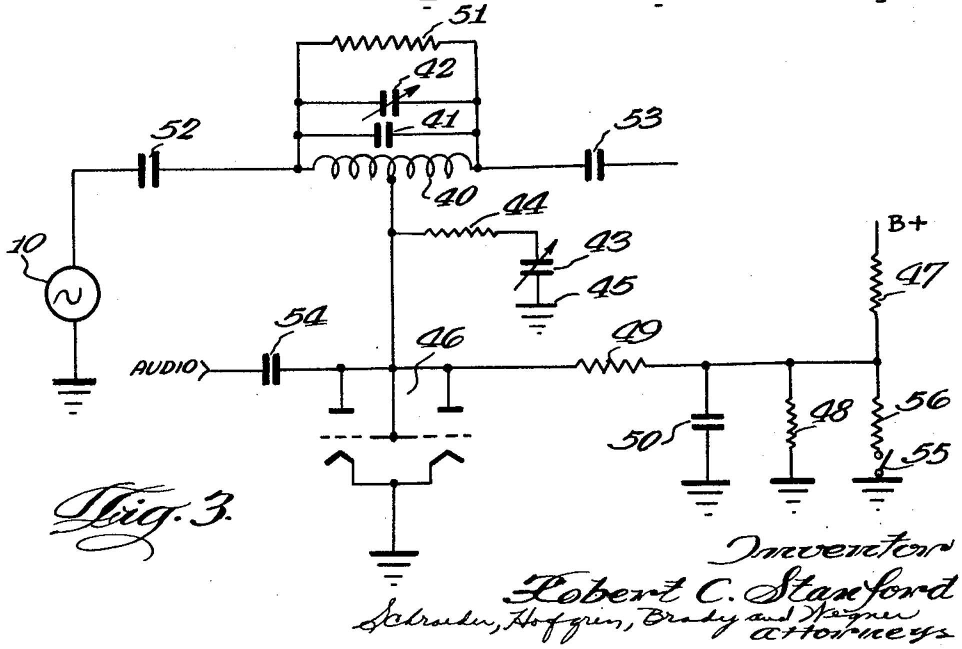
Figure 3 is a schematic circuit drawing of a modified embodiment of the invention.

A modified embodiment of the invention is illustrated in Figure 3, which is designed for operation with a carrier of 4.95 megacycles. Inductor 40 in the series portion of the bridged T filter is tuned to resonance by the parallel combination of a fixed capacitor 41, 82 $\mu\mu$f. and a variable capacitor 42, 2–13 $\mu$f. The inductor 40 is center tapped to eliminate one of the shunt capacitors, and the shunt circuit of the filter includes a variable capacitor 43, 2–13 $\mu\mu$f., providing the phase balance control, connected in series with a resistor 44, 2700 ohms, from the center tap of the inductor 40 to ground 45. Connected in parallel with the phase balance control circuit is a diode 46, which comprises both sections of a dual triode, a 12AU7, connected in parallel with the grids tied to the plate for diode operation. A tube is preferable to a solid rectifier, such as a silicone diode, because of the temperature instability of solid rectifiers. Suitable bias is applied to the diode 46 from a voltage divider made up of resistor 47, 200,000 ohms and resistor 48, 68,000 ohms, connected across the 150 volt regulated B supply. Radio frequency decoupling is achieved with resistor 49, 220,000 ohms, and capacitor 50, 0.005 $\mu$f.

The particular diode arrangement shown in Figure 3 has its best linear characteristic when it appears as 3000–5000 ohms at the carrier frequency. In order to achieve phase balance with a resistance of this order in the shunt leg of the T filter, it is necessary to operate the coil with a Q of about 25. Inasmuch as the normal Q of the inductor 40 is of the order of 100, a resistor 51, 12,000 ohms, is shunted across the series tuned circuit of the filter to reduce the Q. Variable capacitors 42 and 43 are preferably air trimmers which have a smooth adjustment and are quite stable in operation.

The carrier frequency $f_c$ is coupled from the source 10 through a capacitor 52, 39 $\mu\mu$f. to the input of the filter, while the side band output is derived to capacitor 53, 390 $\mu\mu$f. The audio signal is coupled to the diode 46 through capacitor 54, 0.02 $\mu$f.

Provision is made in the circuit of Figure 3 for unbalancing the filter to achieve double side band operation. A switch 55 when closed shunts resistor 56, 150,000 ohms, across resistor 48 in the voltage divider network. This drops the bias voltage on the diode, from about 65 volts to about 28 volts, sufficiently unbalancing the filter so that the full carrier is present in the output.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A modulating system of the character described, comprising: a source of carrier signal; a balanced, bridged T, band-suppression filter tuned to the carrier frequency with an input connected to said carrier signal source, said filter including a tuned series arm and a resistive diode element in the shunt leg; a direct current bias network connected with said diode element; a source of modulating signal; and means connecting said source of modulating signal across said diode element for varying the resistance thereof in accordance with said modulating signal.

2. A modulating system of the character described, comprising: a source of carrier signal; a balanced, bridged T, band-suppression filter including a series arm comprising an inductor and a capacitor connected in parallel and tuned to the carrier frequency and a resistive diode element in the shunt leg, said filter having an input connected to said carrier signal source; a direct current bias network connected with said diode element; a source of modulating signal; and means connecting said source of modulating signal across said diode element for varying the resistance thereof in accordance with said modulating signal.

3. A modulating system of the character described in claim 2, wherein a phase balance adjusting means including an adjustable capacitor is shunted across said diode.

References Cited in the file of this patent

UNITED STATES PATENTS

| | | |
|---|---|---|
| 2,268,837 | Lutzenberger | Jan. 6, 1942 |
| 2,465,265 | Ressler | Mar. 22, 1949 |
| 2,567,380 | Kingsburg | Sept. 11, 1951 |
| 2,718,622 | Harkless | Sept. 20, 1955 |